(No Model.)
G. W. IRWIN.
CORN HARVESTER.
No. 255,790. Patented Apr. 4, 1882.
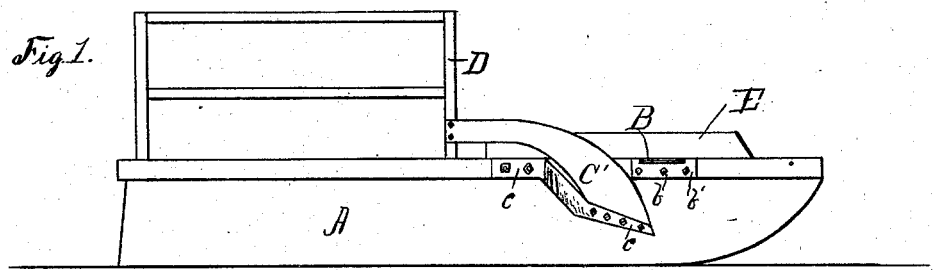
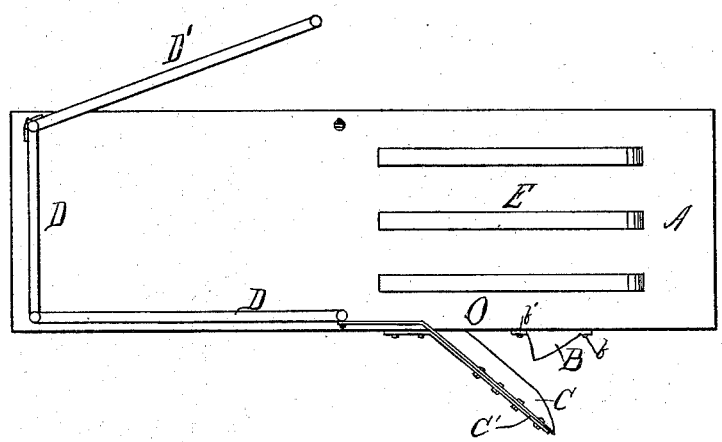
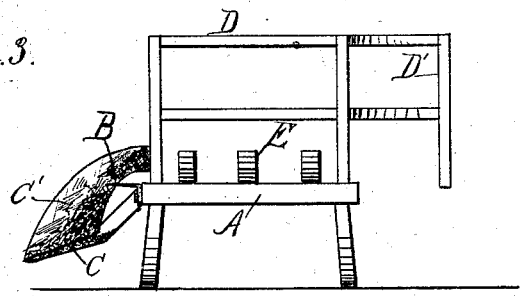
Witnesses.
T. Everett Brown
H. W. Munday
Inventor.
George W. Irwin.
by
Munday, Evarts & Adcock
his Attys.

UNITED STATES PATENT OFFICE.

GEORGE W. IRWIN, OF OTTAWA, KANSAS, ASSIGNOR TO HIMSELF AND EDWARD M. CRANDAL, OF CHICAGO, ILLINOIS.

CORN-HARVESTER.

SPECIFICATION forming part of Letters Patent No. 255,790, dated April 4, 1882.

Application filed June 2, 1881. (No model.)

*To all whom it may concern:*

Be it known that I, GEORGE W. IRWIN, of Ottawa, in the county of Franklin and State of Kansas, have invented certain new and useful Improvements in Corn-Harvesters, of which the following is a specification.

This invention relates to improvements in corn-harvesters; and it consists in the novel construction and combinations of parts, hereinafter set forth.

In the accompanying drawings, Figure 1 is a side view, Fig. 2 a top view, and Fig. 3 a front view, of my improved harvester.

In said drawings, A represents a sled or other vehicle suitable for the purpose. It is provided upon the side with two knives for severing the stalks a short distance above the ground. These knives are quite different from each other. One, B, is triangular in form, or that portion of it which stands out from the sled is so shaped, and is sharpened upon the outer or front edge. It is secured to the sled by screws $b$, passing through a downward flange $b'$, formed upon the knife. This knife may not sever the stalk, but if not, will deflect it against the long knife C, secured in the rear of knife B, and projecting forward and outward at an angle, as clearly shown, so that all the stalks in a row of hills may fall with certainty into the embrace thereof as the sled moves forward. The blade or knife C is also made to lean downward, as shown, so that its operation upon the corn will be in the nature of a draw-cut. I support this long knife by a vertical shield, C', of sheet metal or similar material, extending from the outer end of the knife up to the upright frame D and secured thereto, as shown. The knife may have a rigid back frame, if desired, or it may be provided with flanges whereby to secure it to the sled and shield at its ends, as seen at $c\ c$. The shield C' is also useful as a guard in gathering the severed corn and in straightening such as may lean over.

As the sled is drawn along the attendant, who stands at O, takes hold of each hill of corn near the top of the stalks just before they are severed by the knife, which not only is the easist time to grasp the stalks composing the hill, but the tops being held also assists and renders more certain the operation of the knife in severing the stalks. As the hills of corn are usually about three and a half feet apart, and as the sled is drawn along at the ordinary gait of horses in walking, it is obvious that one man can do no more than simply to grasp the hills of corn, which are usually composed of from two to five stalks, and pitch or incline them across the risers E, taking care to lay them straight and evenly, so that the other attendant can pick them up readily by armfuls and deposit them against the railing or frame-work in a vertical position, so as to be readily lifted off by handfuls and shocked on the ground close to the sled by the two attendants when the same is stopped. In operation I prefer to stop and shock the corn collected on the sled about every fifteen rods and to stop at the same place each time, so as to form long continuous ricks or shocks of corn across the field about fifteen rods apart, as after being harvested in this way the intermediate strips of ground, about fifteen rods in width, between the ricks may be plowed in the fall, thus in a great measure obviating the inconvenience in plowing resulting from collecting the corn in shocks about three rods apart each way, as heretofore has usually been done. It is obvious that the corn collected at each time on the sled should be enough to extend the length of the rick a distance equal to the width of the rows of corn apart, so that the attendant in shocking can stand still on the ground and lift the corn in handfuls from the sled to the rick without having to carry or walk with it at all. This can be easily regulated by adjusting the thickness or width of the ricks to correspond to their distance apart and the nature or heaviness of the crop being harvested. I am thus enabled by very simple and cheap means to save much of the time and heavy labor usually incident to the cutting and shocking of corn.

It will be observed that the risers E should be of sufficient height to enable the attendant to readily put his arm around the corn lying thereon, as otherwise it would be impracticable for the attendant to take care of the corn as fast as it is cut and deposited on the sled.

I claim—

A corn-harvester consisting of a sled provided with cutting-blades B and C, risers E, and shocking-frame D, the whole combined, arranged, and adapted to operate substantially as set forth.

GEORGE W. IRWIN.

Witnesses:
W. S. NELSON,
P. S. COLE.